United States Patent
Higuchi et al.

(10) Patent No.: US 6,790,915 B1
(45) Date of Patent: Sep. 14, 2004

(54) PROCESS FOR PRODUCING ELASTIC FLUOROCOPOLYMER COMPOSITION

(75) Inventors: Tetsuya Higuchi, Settsu (JP); Akihiro Nakashima, Settsu (JP); Yutaka Ueta, Settsu (JP); Satoshi Komatsu, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 64 days.

(21) Appl. No.: 10/069,940

(22) PCT Filed: Aug. 31, 2000

(86) PCT No.: PCT/JP00/05906

§ 371 (c)(1),
(2), (4) Date: Mar. 1, 2002

(87) PCT Pub. No.: WO01/16215

PCT Pub. Date: Mar. 8, 2001

(30) Foreign Application Priority Data

Sep. 1, 1999 (JP) .......................... 11-247332

(51) Int. Cl.[7] .................................. C08F 8/30
(52) U.S. Cl. .................................. 525/375; 525/326.4
(58) Field of Search .............................. 525/326.4, 375

(56) References Cited

U.S. PATENT DOCUMENTS

| | | | |
|---|---|---|---|
| 3,876,616 A | | 4/1975 | Tang |
| 3,997,705 A | * | 12/1976 | Trautvetter et al. .......... 525/340 |
| 4,132,845 A | * | 1/1979 | Covington et al. .......... 528/499 |
| 4,141,874 A | | 2/1979 | Oka et al. |
| 6,239,223 B1 | * | 5/2001 | Effenberger et al. ........ 525/199 |
| 6,310,141 B1 | * | 10/2001 | Chen et al. .................. 525/199 |

FOREIGN PATENT DOCUMENTS

| | | |
|---|---|---|
| EP | 0 574 913 A1 | 12/1993 |
| EP | 0 684 276 A1 | 11/1995 |
| EP | 0 796 877 A1 | 9/1997 |
| JP | 50-22048 | 3/1975 |
| JP | 55-45734 A | 3/1980 |
| JP | 56-29895 B2 | 7/1981 |
| JP | 56-90836 A | 7/1981 |
| JP | 56-147840 A | 11/1981 |
| JP | 57-14775 B2 | 3/1982 |
| JP | 6-9825 B2 | 2/1994 |
| JP | 7-157584 A | 6/1995 |
| JP | 10-36570 A | 2/1998 |
| JP | 10-176090 A | 6/1998 |
| WO | 96/17876 A1 | 6/1996 |

* cited by examiner

Primary Examiner—Bernard Lipman
(74) Attorney, Agent, or Firm—Birch, Stewart, Kolasch & Birch, LLP

(57) ABSTRACT

A process for preparing a fluorine-containing elastomeric copolymer, a vulcanizing agent and a vulcanization accelerator, said process comprising the step of coagulating the copolymer from an aqueous dispersion of the fluorine-containing elastomeric copolymer and drying the resulting coagulate of the copolymer while kneading, wherein a mixture of mutually soluble components consisting of the vulcanizing agent and the vulcanization accelerator is added to the coagulate, can give a fluororubber composition having stable vulcanization physical properties, wherein the vulcanizing agent and the vulcanization accelerator are homogeneously dispersed in the fluororubber.

15 Claims, No Drawings

PROCESS FOR PRODUCING ELASTIC FLUOROCOPOLYMER COMPOSITION

This application is the national phase under 35 U.S.C. § 371 of PCT International Application No. PCT/JP00/05906 which has an International filing date of Aug. 31, 2000, which designated the United States of America.

FIELD OF THE INVENTION

The present invention relates to a process for preparing a fluorine-containing elastomeric copolymer composition comprising a fluorine-containing elastomeric copolymer (hereinafter referred merely to as a "fluororubber") and, more particularly, to a process for preparing a fluorine-containing elastomeric copolymer composition containing a polyhydroxy compound or a salt thereof as a vulcanization component.

RELATED ART

Fluororubbers obtained from vinylidene fluoride and at least one other fluorine-containing monomer have been used in various industries because of excellent heat resistance, chemical resistance and oil resistance. It is necessary to cure a polymer by vulcanization so as to satisfy the properties described above under severe conditions.

The fluororubber is prepared by copolymerizing a monomer using a water-soluble initiator and/or an oil-soluble initiator. For example, Japanese Kokoku (Examined) Patent Publication No. 56-29895 and Japanese Kokoku (Examined) Patent Publication No. 56-34009 (corresponding to U.S. Pat. No. 4,141,874) disclose a process for preparing a fluororubber by a two-stage polymerization, wherein a water-soluble initiator is used in a first stage of the polymerization and an oil-soluble initiator is used in a second stage of the polymerization. In the second stage of the polymerization using the oil-soluble initiator, the oil-soluble initiator is homogeneously dispersed by adding an emulsifier to a medium.

The resulting fluororubber is mixed with a vulcanizing agent (for example, a polyhydroxy compound) and a vulcanization accelerator (for example, a quaternary ammonium salt) to give a composition for vulcanization.

The process for mixing the fluororubber with the vulcanizing agent and the vulcanization accelerator is roughly classified into a process for coagulating an aqueous dispersion (of a fluororubber by adding a vulcanizing agent and a vulcanization accelerator to the aqueous dispersion, and a process of isolating a fluororubber from an aqueous dispersion of fluororubber by coagulation, drying the fluororubber and kneading the fluororubber with a vulcanizing agent and a vulcanization accelerator.

Japanese Kokoku (Examined) Patent Publication No. 56-34009 (corresponding to U.S. Pat. No. 4,141,874) discloses a fluororubber composition obtained by mixing a fluororubber with an acid acceptor, an aromatic polyhydroxy compound and a specific quaternary ammonium compound and kneading the mixture.

However, the kneading operability is poor and it is difficult to homogeneously mix the fluororubber with the vulcanizing agent and the vulcanization accelerator. Furthermore, the kneading of the fluororubber having high viscosity requires large energy. The quaternary ammonium compound adsorbs moisture in an atmospheric air because of its hygroscopicity and, therefore, it is inferior in handling properties.

Japanese Kokai (Unexamined) Patent Publication No. 56-147840 discloses a process for preparing a composition for vulcanization of a fluororubber, which comprises adding a quaternary ammonium compound and/or a quaternary phosphonium compound, as a vulcanization accelerator, to an aqueous emulsion or an aqueous dispersion of a fluororubber, thereby to cause coagulation. According to this process, the fluororubber, the vulcanizing agent and the vulcanization accelerator can be homogeneously mixed and the efficiency is better than that in case of kneading.

However, because of its hygroscopicity, the quaternary ammonium compound tends to be incorporated into the aqueous medium during the coagulation from the aqueous dispersion, together with the fluororubber. Therefore, when a predetermined amount of the quaternary ammonium compound is intended to be incorporated into the fluororubber, at least a predetermined amount of the quaternary ammonium compound must be added to the aqueous medium and the amount of it to be incorporated into the fluororubber is changeable.

Both of the aqueous fluororubber dispersion and the aqueous fluororubber emulsion obtained using an oil-soluble initiator contain an emulsifier. However, it is known that the action of the quaternary ammonium compound is inhibited by the emulsifier.

WO96/17876(PCT/JP95/2485) describes that a polyhydroxy aromatic compound and a quaternary phosphonium salt are incorporated into the fluororubber prepared by a two-stage polymerization described above by kneading. However, it is known that the action of the quaternary phosphonium salt is also inhibited by the emulsifier.

Japanese Kokoku (Examined) Patent Publication No. 57-14775 discloses that a fluororubber is kneaded with a solid solution of a quaternary ammonium compound and a polyhydroxy aromatic compound in order to avoid an influence of the hygroscopicity of the quaternary ammonium compound. However, according to this process, poor dispersion of the solid solution occurs and thus vulcanization physical properties of the molded article are not stable.

Japanese Kokai (Unexamined) Patent Publication No. 50-22048 discloses a process for preparing a fluorine-containing elastomeric copolymer composition, which comprises continuously feeding a wetted fluorine-containing elastomeric copolymer bulk having a water content of about 15 to 35% by weight, which is a coagulate of a fluorine-containing elastomeric copolymer latex, to a mixing region, feeding a vulcanizing agent and a vulcanization accelerator in the form of fine powders, and mixing them while maintaining the particle size of the fluorine-containing elastomeric copolymer bulk. The publication describes with respect to this mixing operation that the vulcanizing agent and the vulcanization accelerator should be fed to the mixing region in the form of fine powders in an aqueous dispersion and that the temperature should be maintained at low temperature enough to prevent the adverse reaction between the fluorine-containing elastomeric copolymer and the curing components or other additives, which are present in the mixture. However, the quaternary phosphonium salt as the curing component is easily dissolved because of its water solubility, so that the quaternary phosphonium salt is consumed together with separated water when treated in an apparatus such as extruder. Since the mixing operation is conducted while maintaining the particle size of the fluorine-containing elastomeric copolymer bulk, there is a limit in homogeneity of the composition. Furthermore, it is difficult to continuously feed a constant amount of a fine-powdery solid material and, therefore, a predetermined amount of it cannot be incorporated and vulcanization physical properties of the molded article are not stable.

The fluorine-containing elastomeric copolymer composition is generally prepared by kneading a fluororubber with a vulcanizing agent and a vulcanization accelerator using an apparatus such as kneader. However, the kneading operation in a kneader requires large energy and charge of raw materials into the kneader is hard for an operator. The vulcanizing agent and the vulcanization accelerator are usually in the form of powders and, therefore, risk to the operator in case of charging them into the kneader is considered to be a serious problem.

SUMMARY OF THE INVENTION

An object of the present invention is to provide a process for preparing a composition for vulcanization of a fluororubber in a good efficiency.

Another object of the present invention is to provide a process which makes it possible to obtain a fluororubber composition having stable vulcanization physical properties, wherein a vulcanizing agent and a vulcanization accelerator are homogeneously dispersed in a fluororubber.

The present invention provides a process for preparing a fluorine-containing elastomeric copolymer composition comprising a fluorine-containing elastomeric copolymer, a vulcanizing agent and a vulcanization accelerator, said process comprising the step of coagulating the copolymer from an aqueous dispersion of the fluorine-containing elastomeric copolymer and drying the resulting coagulate of the copolymer while kneading, wherein a mixture of mutually soluble components consisting of the vulcanizing agent and the vulcanization accelerator is added to the coagulate.

DETAILED DESCRIPTION OF THE INVENTION

The fluororubber is an elastomeric copolymer of vinylidene fluoride and at least one other fluorine-containing monomer. Examples of the other fluorine-containing monomer include tetrafluoroethylene, trifluorochloroethylene, trifluoroethylene, hexafluoropropylene, pentafluoropropylene, perfluoro(methyl vinyl ether), perfluoro (ethyl vinyl ether), and perfluoro (propyl vinyl ether).

The aqueous dispersion of the fluororubber may be prepared by any of polymerization processes known in the prior arts. The process of the present invention can be applied to an aqueous dispersion obtained by a two-stage polymerization process wherein a water-soluble initiator is used in a first stage of the polymerization and an oil-soluble initiator is used in a second stage of the polymerization, which aqueous dispersion may contain an emulsifier.

The vulcanizing agent includes, for example, a polyhydroxy compound. The polyhydroxy compound used as the vulcanizing agent is preferably a polyhydroxy aromatic compound. As the polyhydroxy aromatic compound, any of compounds known as the vulcanizing agent of the fluororubber can be used. Preferred examples thereof include 2,2-bis(4-hydroxyphenyl)propane (bisphenol-A), 2,2-bis(4-hydroxyphenyl)perfluoropropane (bisphenol-AF), resorcin, 1,3,5-trihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl)butane (bisphenol-B), 4,4-bis(4-hydroxyphenyl) valeric acid, 2,2-bis(4-hydroxyphenyl) tetrafluorodichloropropane, 4,4'-dihydroxydiphenylsulfone, 4,4'-dihydroxydiphenylketone, tri(4-hydroxyphenyl) methane, 3,3',5,5'-tetrachlorobisphenol-A, and 3,3',5,5'-tetrabromobisphenol-A. Alkali metal salts or alkali earth metal salts thereof can also be used.

The vulcanization accelerator includes, for example, an onium compound. Examples of the onium compound include an ammonium compound, a phosphonium compound, an oxonium compound, and a sulfonium compound. A quaternary ammonium salt and a quaternary phosphonium salt are preferred.

As the quaternary ammonium salt or quaternary phosphonium salt, any of those known as the vulcanization accelerator of the fluororubber can be used. Preferred examples thereof include: quaternary ammonium salts, for example, 8-methyl-1,8-diazabicyclo[5.4.0]-7-undecenium chloride, 8-methyl-1,8-diazabicyclo[5.4.0]-7-undecenium iodide, 8-methyl-1,8-diazabicyclo[5.4.0]-7-undecenium hydroxide, 8-methyl-1,8-diazabicyclo[5.4.0]-7-undecenium methyl sufate, 8-ethyl-1,8-diazabicyclo[5.4.0]-7-undecenium bromide, 8-propyl-1,8-diazabicyclo[5.4.0]-7-undecenium bromide, 8-dodecyl-1,8-diazabicyclo[5.4.0]-7-undecenium chloride, 8-dodecyl-1,8-diazabicyclo[5.4.0]-7-undecenium hydroxide, 8-eicosyl-1,8-diazabicyclo[5.4.0]-7-undecenium chloride, 8-tetracosyl-1,8-diazabicyclo[5.4.0]-7-undecenium chloride, 8-benzyl-1,8-diazabicyclo[5.4.0]-7-undecenium chloride, 8-benzyl-1,8-diazabicyclo[5.4.0]-7-undecenium hydroxide, 8-phenethyl-1,8-diazabicyclo[5.4.0]-7-undecenium chloride, and 8-(3-phenylpropyl)-1,8-diazabicyclo[5.4.0]-7-undecenium chloride; and quaternary phosphonium salts, for example, tetrabutylphosphonium chloride, benzyltriphenylphosphonium chloride, benzyltrimethylphosphonium chloride, and benzyltributylphosphonium chloride.

In the present invention, a mixture of mutually soluble components consisting of the onium compound and the polyhydroxy compound or a salt thereof is used. The mixture of mutually soluble components is a solid solution or a melt.

The solid solution can be prepared by a conventional method. The solid solution used in the present invention can be obtained from the onium compound and the polyhydroxy compound or a salt thereof. The respective components may be converted into a homogeneous state, for example, by a conventional method of mixing both components and melting with heating until both components are liquefied to form a homogeneous mixture, or melting both components with heating under stirring, thereby homogeneously mixing them, and cooling the mixture.

The melt is prepared by heating the onium compound and the polyhydroxy compound or a salt thereof, or a solid solution thereof to at least the melting point, thereby converting into a molten state.

The amount of both components constituting the mixture of mutually soluble components is preferably controlled so that the amount of the onium compound is within a range from 5 to 400 parts by weight, particularly from 10 to 100 parts by weight, based on 100 parts by the polyhydroxy compound or a salt thereof.

The ratio of both components constituting the mixture of mutually soluble components may be previously set to a proper ratio. Alternatively, a mixture of two mutually soluble components in a given ratio is previously prepared and the ratio of both components can also be controlled by adding the polyhydroxy compound or a salt thereof when using the mixture of mutually soluble components. Thus, it is made possible to cope with various weight ratios of the onium on compound to the polyhydroxy compound by only one mixture of mutually soluble components.

At least two mixtures of mutually soluble components may be used in combination. For example, a mixture of mutually soluble components consisting of a quaternary ammonium salt and a polyhydroxy compound can be used in combination of a mixture of mutually soluble components consisting of a quaternary phosphonium salt and a polyhydroxy compound.

The solid solution may be used in the form of powders in order to homogeneously mix with a coagulate of the copolymer. The average particle size thereof is preferably within a range from 10 $\mu$m to 2,000 $\mu$m, more preferably from 10 $\mu$m to 1,000 $\mu$m, e.g. 20 $\mu$m to 300 $\mu$m, particularly preferably from 20 $\mu$m to 50 $\mu$m.

The content of the mixture of mutually soluble components in the composition for vulcanization is usually within a range from 0.1 to 10 parts by weight, preferably from 1 to 5 parts by weight, based on 100 parts by weight of the fluorine-containing elastomeric copolymer.

According to the process of the present invention, a copolymer is coagulated from an aqueous dispersion and the coagulated copolymer is removed from an aqueous medium by a conventional method.

The coagulation operation may be conducted by a conventional method. For example, a proper inorganic or organic acid (for example, hydrochloric acid, sulfuric acid, nitric acid, phosphoric acid, formic acid, acetic acid, oxalic acid, etc.) is added to an aqueous dispersion of a copolymer. An inorganic or organic coagulating agent, for example, aluminum sulfate, magnesium chloride, ammonium chloride, potassium alum, polyalkylamine or a salt thereof can also be used. An acid and a coagulant may be used in combination.

In the present invention, a mixture of mutually soluble components is added to the copolymer coagulate, before, during or after the step of drying the copolymer coagulate. Then, the copolymer is sufficiently kneaded with the mixture of mutually soluble components to obtain a fluororubber composition comprising the copolymer and the mixture of mutually soluble components. The step of drying the coagulate while kneading can be conducted in an extruder. The addition of the mixture of mutually soluble components can be conducted by a metering pump in case of the melt, while it can be conducted by a metering feeder in case of the solid solution.

The method of adding the mixture of mutually soluble components to the copolymer coagulate includes the following three embodiments.

In the first embodiment, the mixture of mutually soluble components is added to the coagulate before the step of drying the coagulate. Before the step of drying the coagulate of the copolymer, the mixture of mutually soluble components is continuously fed to the coagulate removed from the aqueous dispersion and the resultant mix is dried while kneading. The mixture of mutually soluble components is preferably a solid solution, particularly preferably a powdery solid solution. After the mixture of mutually soluble components is added to the wetted copolymer thus coagulated immediately before the drying step, the copolymer and the mixture of mutually soluble components can be dried while melt-kneading. During the coagulate of the copolymer is fed in an extruder for the following drying step, the mixture of mutually soluble components (melt or solid solution) can be continuously fed in the extruder. The powdery solid solution can be fed through a hopper of the extruder. When sufficient kneading and drying are conducted in the extruder, a kneader, which follows the extruder, is not employed.

In the second embodiment, the mixture of mutually soluble components is added to the coagulate during the step of drying the coagulate. The mixture of mutually soluble components in a molten state is preferably added to the copolymer in a molten state. While melt-kneading the copolymer during the drying step in the extruder (for example, twin-screw extruder), the mixture of mutually soluble components in a molten state can be added. The mixture of mutually soluble components is preferably added in the state that the volatile content (for example, water, emulsifier, oligomer, etc.) of the coagulate is small (namely, in the state that the drying step has nearly been completed). The mixture of mutually soluble components may be added to the coagulate whose volatile content (especially water content) is at least 0.01% by weight and less than 1.5% by weight, and particularly from 0.05 to 0.5% by weight. The volatile content means a weight ratio of the volatile component to the whole coagulate. After continuously feeding the copolymer coagulate to the drying step, the mixture of mutually soluble components may be continuously fed to the drying step and then continuously dried while kneading. One extruder may comprises a drying zone where the coagulate is dehydrated and dried, and a kneading zone where the dehydrated and dried coagulate is kneaded with the mixture of mutually soluble components. As used herein, the term "dehydration" means that water is squeezed out from the coagulate between screws. The extruder may be provided with a metering feeder (for example, plunger pump) for feeding the mixture of mutually soluble components so that a weight ratio of the copolymer to the mixture of mutually soluble components in the extruder is constant. When sufficient kneading and drying are conducted in the extruder, a kneader, which follows the extruder, is not employed.

In the third embodiment, the mixture of mutually soluble components is added to the coagulate after the completion of drying of the coagulate. The process of the present invention further comprises the kneading step after the step of drying while kneading, and a melt or a solid solution may be added before the kneading step and after the completion of the drying step. The drying step and the kneading step may be conducted by two extruders, and a first extruder in charge of the drying step and a second extruder in charge of the kneading step can be used. The second extruder may be a surface renewal type kneader. Preferably, the first extruder is a twin-screw extruder, while the second extruder may be either of a single-screw extruder and a twin-screw extruder. A more homogeneous copolymer composition can be obtained by arranging a gear pump between the first extruder and the second extruder.

Depending on the preparation method, the aqueous dispersion of the fluorine-containing elastomeric copolymer used in the present invention contains an emulsifier, particularly when an oil-soluble initiator is used. Since the emulsifier is likely to inhibit the action of the quaternary ammonium compound, the emulsifying action of the emulsifier can be previously lowered by adding an acid before the coagulation of the copolymer.

The acid is preferably added in the amount which makes it possible to adjust the pH of the aqueous dispersion to at most 2.

The acid may be either of an inorganic acid and an organic acid, and examples of the former include hydrochloric acid, sulfuric acid, nitric acid and phosphoric acid, while examples of the latter include carboxylic acids such as formic acid, acetic acid and oxalic acid.

Depending on the kind of the compounds used as the initiator, the aqueous dispersion sometimes exhibits acidic properties. In this case, the aqueous dispersion can be neutralized by adding a base before the coagulation of the copolymer.

The base is preferably added in the amount which makes it possible to adjust the pH of the aqueous dispersion within a range from 7 to 9. As the base, an amine, ammonia, an alkali metal hydroxide, and an alkali earth metal hydroxide can be used. Among these bases, $NH_4OH$ and $Na_2CO_3$ are preferred.

An additive, which is usually added to the fluororubber composition, may be previously added to the aqueous dispersion. Examples of the additive, which may be added to the aqueous dispersion, include fillers and reinforcers, such as carbon black, clay, diatomaceous earth and talc. If necessary, a plasticizer and a colorant can also be added.

PREFERRED EMBODIMENTS OF THE INVENTION

The following Examples further illustrate the present invention.

EXAMPLE 1

A wet coagulate (containing water in the same amount as that of the copolymer) of a fluorine-containing elastomeric copolymer having an average particle size of at most 5 mm (a copolymer of vinylidene fluoride and hexafluoropropylene in a molar ratio of 78/22, Mooney viscosity: $ML_{1+10}$ (100° C.)=56) was fed in a twin-screw extruder through a metering feeder. A feeding rate of the wet coagulate was about 50 kg/hour. The coagulate fed in the twin-screw extruder was sent to a dehydration/drying zone by means of the twin-screw extruder, where a large amount of moisture was separated and discharged. After removing a large amount of moisture, the coagulate was further kneaded using two screws and then converted into a molten state by temperature rise due to energy given from a screw axis and temperature rise due to heat given from heaters attached to barrels.

The fluorine-containing elastomeric copolymer in the molten state was kneaded using two screws and the volatile component contained therein (for example, water, an emulsifier and an oligomer) was sucked and discharged through a vacuum vent port while repeating renewal of the surface. The retention time of the copolymer in the dehydration/drying zone was 5 minutes.

After passing through the dehydration/drying zone, the fluorine-containing elastomeric copolymer whose low volatile content had been removed (temperature: 185° C., moisture: 0.1%) was set to a kneading zone. Immediately before the kneading zone, a melt of bisphenol AF (BIS-AF) and DBU-B (8-benzyl-1,8-diazabicyclo[5,4,0]-7-undecenium chloride) in a weight ratio of 2:0.35 controlled at a temperature of 150° C. was continuously charged. The fluorine-containing elastomeric copolymer and the melt were kneaded at a constant ratio (weight ratio of the copolymer to the melt=100:2.35). After the addition of the melt, the kneading time (namely, retention time of the copolymer in the kneading zone) was 1 minute. A material discharged through a die was a homogeneous fluorine-containing elastomeric copolymer composition.

To this fluorine-containing elastomeric copolymer composition, other additives were sequentially added in the amount (parts by weight) shown in Table 1. The mixture was kneaded on rolls at room temperature and then allowed to stand over one night for maturing.

After re-kneading, the re-kneaded mixture was charged in a mold and subjected to primary vulcanization under vulcanization conditions of a temperature of 170° C. and a pressure of 50 kg/cm² for 10 minutes to produce a sheet and an P24 O-ring. The molded sheet and O-ring were demolded from the mold and then subjected to secondary vulcanization in an oven at a temperature of 230° C. for 24 hours.

With respect to the sheet of the vulcanized fluororubber thus obtained, a 100% tensile stress, a tensile strength, an elongation and a hardness were measured. With respect to the P24 O-ring, a compression set was measured. These physical properties were measured in accordance with JIS K 6301. The results are shown in Table 1.

The dispersibility was evaluated as follows. After forming into a 0.1 mm thick film in a state of a raw rubber (100° C.×5 minutes, or 120° C.×5 minutes), the dispersion state of the vulcanization components (solid solution, bisphenol AF and/or DBU-B) is observed by a magnifying glass (40 times magnification). The case where entirely homogeneous dispersion state is observed is rated as "good", whereas the case where the mottled dispersion state is observed is rated as "poor". The results are shown in Table 1.

The roll processability was evaluated as follows. The case where the mixture can be smoothly kneaded without causing separation on front and rear rolls for kneading is rated as "good", whereas the case where the mixture can not be smoothly kneaded is rated as "poor". The results are shown in Table 1.

TABLE 1

| Components | | |
|---|---|---|
| | Fluorine-containing elastomeric copolymer | 100 |
| | Melt | 2.35 |
| | MT carbon black | 20 |
| | Magnesium oxide | 3 |
| | Calcium hydroxide | 6 |
| Dispersibility of vulcanization component | | good |
| Roll processability | | good |
| Vulcanization | Press vulcanization | 170° C. × 10 minutes |
| | Oven vulcanization | 230° C. × 24 hours |
| Physical properties at ordinary state | 100% Tensile stress [kg/cm²] | 56 |
| | Tensile strength [kg/cm²] | 176 |
| | Elongation [%] | 218 |
| | Hardness | 71.2 |
| | Compression set [%] (200° C. × 70 hours) | 16.6 |

Samples of the copolymer composition were collected every constant time. As a result, scatter in physical properties between the samples of the copolymer composition was scarcely observed.

According to the present invention, the predetermined amounts of a vulcanizing agent and a vulcanization accelerator can be incorporated into a fluorine-containing elastomeric copolymer, easily and homogeneously, at low energy. Consequently, the amount of the vulcanizing agent can be reduced and thus vulcanization physical properties of the molded article are improved and made stable. A loss of the vulcanization agent and the vulcanization accelerator can be reduced even if a fluorine-containing elastomeric copolymer having a high water content is treated.

What is claimed is:
1. A process for preparing a fluorine-containing elastomeric copolymer composition comprising a fluorine-containing elastomeric copolymer, a vulcanizing agent and a vulcanization accelerator, said process comprising the step of coagulating the copolymer from an aqueous dispersion of the fluorine-containing elastomeric copolymer and drying the resulting coagulate of the copolymer while kneading, wherein a mixture of mutually soluble components consisting of the vulcanizing agent and the vulcanization accelerator is added to the coagulate, the mixture of mutually soluble components is a solid solution or a melt, dehydration in which water is squeezed out from the coagulate is conducted in an extruder, and the step of drying the coagulate while kneading is conducted in the extruder.

2. The process according to claim 1, wherein the vulcanizing agent is a polyhydroxy compound or a salt thereof and the vulcanization accelerator is an onium compound.

3. The process according to claim 1, wherein the mixture of mutually soluble components in a molten state is kneaded with the coagulate of the fluorine-containing elastomeric copolymer in a molten state.

4. The process according to claim 1, wherein a melt or a solid solution of the vulcanizing agent and the vulcanization accelerator is added to the coagulate during the step of drying the coagulate.

5. The process according to claim 1, further comprising a kneading step after the step of drying while kneading, wherein a melt or a solid solution of the vulcanizing agent and the vulcanization accelerator is added after the completion of the drying step and before the kneading step.

6. The process according to claim 5, wherein the drying step and the kneading step are conducted by two extruders and a first extruder in charge of the drying step and a second extruder in charge of the kneading step are used.

7. The process according to claim 5, wherein the first extruder is a twin-screw extruder.

8. The process according to claim 1, wherein a solid solution of the vulcanizing agent and the vulcanization accelerator is added to the coagulate before the step of drying while kneading.

9. The process according to claim 1, wherein the vulcanization accelerator is an onium compound and the onium compound is at least one quaternary salt selected from the group consisting of a quaternary ammonium salt and a quaternary phosphonium salt.

10. The process according to claim 9, wherein the quaternary ammonium salt is 8-benzyl-1,8-diazabicyclo[5.4.0]-7-undecenium chloride and the polyhydroxy compound is 2,2-bis(4-hydroxyphenyl)perfluoropropane.

11. The process according to claim 1, wherein the quaternary phosphonium salt is benzyltriphenylphosphonium chloride and the polyhydroxy compound is 2,2-bis(4-hydroxy-phenyl)perfluoropropane.

12. The process according to claim 1, wherein the mixture of mutually soluble components is at least one selected from the group consisting of a mixture of mutually soluble components consisting of a quaternary ammonium salt and a polyhydroxy compound, a mixture of mutually soluble components consisting of a quaternary ammonium salt and a salt of a polyhydroxy compound, a mixture of mutually soluble components consisting of a quaternary phosphonium salt and a polyhydroxy compound, and a mixture of mutually soluble components consisting of a quaternary phosphonium salt and a salt of a polyhydroxy compound.

13. The process according to claim 1, wherein the vulcanizing agent is also added in case of adding the mixture of mutually soluble components so that the vulcanizing agent and the vulcanization accelerator are incorporated in a predetermined ratio.

14. The process according to claim 1, wherein the ratio of the vulcanizing agent to the vulcanizing accelerator is controlled by adding the vulcanizing agent after the addition of the mixture of mutually soluble components.

15. The process according to claim 1, wherein the addition of the mixture of mutual soluble components to the coagulate is conducted in the extruder.

* * * * *